United States Patent [19]
Scarth et al.

[11] Patent Number: 6,127,298
[45] Date of Patent: Oct. 3, 2000

[54] COMPOSITIONS FOR CERAMIC TILES

[75] Inventors: Niall Scarth, St. Austell; Timothy Strevens Evitt, Huntingdon, both of United Kingdom

[73] Assignee: BCT Limited, Devon, United Kingdom

[21] Appl. No.: 09/272,253

[22] Filed: Mar. 19, 1999

[30] Foreign Application Priority Data

Mar. 20, 1998 [GB] United Kingdom .................... 9806065

[51] Int. Cl.⁷ .......................... C04B 33/00; C04B 35/18; C04B 35/20; C04B 35/22
[52] U.S. Cl. .......................... 501/141; 501/143; 501/153; 501/154
[58] Field of Search ..................... 501/141, 143, 501/153, 154

[56] References Cited

U.S. PATENT DOCUMENTS

| | | | |
|---|---|---|---|
| 450,987 | 4/1891 | Wilkinson | 501/143 |
| 1,110,449 | 9/1914 | Malinovszky | 501/143 |
| 3,759,726 | 9/1973 | Wittels | 501/143 |
| 4,294,635 | 10/1981 | Hurley, Jr. | |

FOREIGN PATENT DOCUMENTS

| | | | |
|---|---|---|---|
| 717006 | 2/1980 | U.S.S.R. | |
| 920037 | 4/1982 | U.S.S.R. | 501/141 |
| 1209640 | 2/1986 | U.S.S.R. | |
| 1174304 | 12/1969 | United Kingdom | |
| 1343399 | 1/1974 | United Kingdom | |

*Primary Examiner*—Mark L. Bell
*Assistant Examiner*—David Sample
*Attorney, Agent, or Firm*—Rothwell, Figg, Ernst & Manbeck, p.c.

[57] ABSTRACT

A composition for ceramic tiles, the composition having being formulated from materials including granite and comprising the following components, given in weight percent, based on the total weight of the composition:

| | |
|---|---|
| $SiO_2$ | 56–64 wt % |
| $Al_2O_3$ | 15–17 wt % |
| $K_2O$ | 2–3 wt % |
| $Na_2O$ | 0.5–1.5 wt % |
| CaO | 5–5.7 wt % |
| MgO | 0.5–0.6 wt % |
| L.O.I. | 6–7 wt %. |

20 Claims, No Drawings

COMPOSITIONS FOR CERAMIC TILES

BACKGROUND OF THE INVENTION

1. Field of the Invention

The present invention relates to compositions which are suitable for the manufacture of ceramic tiles, e.g. wall tiles.

2. Discussion of the Prior Art

Ceramic wall tiles in the UK are commonly composed of clays, silica (milled to a desired particle size) and limestone which are mixed together with water to produce a slurry, or "slip". The clay slip is then spray dried to produce a homogeneous free flowing granulate. The tiles are formed in a press and then dried and fired in a tunnel kiln with a typical firing cycle of around four days. The fired tiles, known as "bisque", are then ready for the glazing cycle. The glazed product can be fired in a tunnel kiln with cycles from 12 to 20 hours, or in a single layer roller kiln with cycles of 30 to 45 minutes. The resultant tiles comprise a tile body with a fired glaze thereon.

Advances in kiln design and glaze technology have led to the development of single fired tiles. This is where the whole tile bisque and glaze are fired together in one kiln in a single firing cycle. This leads to a cost reduction in the manufacturing process.

Current tile body formulations are compromises between the various manufacturing systems and processes.

White firing tile bodies are composed of (i) ball clays, e.g. from Devon and Dorset, (ii) China clays, e.g. from Cornwall and Devon, (iii) silica in the form of sand, from sedimentary deposits, and (iv) cristobalite, a high-temperature form of silica ($SiO_2$) which has to be manufactured from silica sand by heating to 1300–1400° C. and (v) limestone.

The silica is needed to ensure the correct thermal expansion of the tile material during firing and the cristobalite to prevent crazing of the tile material. The limestone is used to provide dimensional stability and together with the silica reduces the moisture expansion of the clays, which increases the craze resistance of the tile. White firing clays, in the UK and elsewhere, are subject to moisture expansion, since the fired clay product can absorb water and expand. The typical outcome of this is crazing. The glaze needs to be under compression. Consequently when the product absorbs water and expands the glaze is no longer under compression. The glaze accordingly cracks to form a circular crazing pattern.

Silica is usually added to control moisture expansion, and to increase the thermal expansion of the clay. Free silica at an addition of from 25–35 wt % is typically added to provide a total silica content of from 65–68 wt %.

Silica has a thermal expansion curve such that at a temperature of 573° C. it undergoes a conversion from "type a" quartz to "type b" quartz. This change is accompanied by a size change which in turn imparts high thermal stress on the product, in particular on cooling. Consequently the tile can crack. Cristobalite is added as a replacement for part of the silica. The weight ratio of the silica to cristobalite is typically in the range of from 2:1 to 3.5:1.

Limestone is added to control the size variation of the finished tile, and additionally it imparts control of moisture expansion by controlling the formation of a glass phase in the tile. Limestone is added to give a typical CaO range of from 5–7 wt %.

A typical known tile composition, wherein the components are express as oxides, is:

| | |
|---|---|
| $SiO_2$ | 66–68 wt % |
| $Al_2O_3$ | 13.5–15.5 wt % |
| CaO | 5–7 wt % |
| MgO | 0.2–0.4 wt % |
| $K_2O$ | 1.0–1.5 wt % |
| $Na_2O$ | 0.15–0.25 wt % |
| $Fe_2O_3$ | 0.6–0.8 wt % |
| $TiO_2$ | 0.7–0.8 wt % |
| L.O.I. | 5–6 wt % |

(L.O.I. means "loss of ignition")

Conventional ceramic tile compositions suffer from a number of disadvantages. The mechanical properties of a fired tile often are not sufficiently good for particular applications. In particular, the thermal shock resistance of the tile body may be insufficiently low. This can cause crazing of the tile when subjected to rapid temperature changes. In addition, the moisture expansion of the tile body can be too high, in turn leading to cracking problems. It is desirable for the tile bodies to be rapidly fired in a single firing cycle but this is not achievable by some tile compositions because of insufficient fluxing action. Moreover, it is required that the variability in the size of the tiles is minimized, but for some known compositions, the tiles can shrink in a variable manner, leading to size variations. Furthermore, the fired tile can have too low a modulus of rupture. Finally, it is desired to avoid the requirement for cristobalite to control the silica expansion. The use of cristobalite to control the silica expansion leads to a high cost element in the tile body formulation due to the inherent high cost of the cristobalite because of its manufacturing process.

The present invention aims at least partially to overcome these problems of the prior art.

SUMMARY OF THE INVENTION

In one aspect the present invention provides a composition for ceramic tiles, the composition having being formulated from materials including granite and comprising the following components, given in weight percent, based on the total weight of the composition:

| | |
|---|---|
| $SiO_2$ | 56–64 wt % |
| $Al_2O_3$ | 15–17 wt % |
| $K_2O$ | 2–3 wt % |
| $Na_2O$ | 0.5–1.5 wt % |
| CaO | 5–5.7 wt % |
| MgO | 0.5–0.6 wt % |
| L.O.I. | 6–7 wt % |

Preferably the composition has the following components:

| | |
|---|---|
| $SiO_2$ | 55.8–63.5 wt % |
| $Al_2O_3$ | 15.6–16.4 wt % |
| $K_2O$ | 2.22–2.66 wt % |
| $Na_2O$ | 0.51–1.32 wt % |
| CaO | 6.13–6.31 wt % |
| MgO | 0.5–0.6 wt % |
| L.O.I. | 6 wt % |

The present invention also provides a composition for a tile body comprising 5–50 wt % sand, 20–60 wt % clay, 5–15 wt % limestone and 5–40 wt % granite. Preferably the composition comprises 15–45 wt % sand, 30–50 wt % clay, 10–13 wt % limestone and 5–30 wt % granite. The composition may optionally include 5–25 wt % mica. Typically, at least some of the sand and the mica are a by-product of China clay extraction. The composition may also include 5–15 wt % China clay.

The present invention further provides a method of manufacturing a tile body, the method comprising formulating a composition according to the present invention and firing the composition to form a tile body.

Preferably, a glaze is applied to a bisque of the formulated composition prior to firing and the firing step comprises a single firing step wherein the bisque and the glaze are fired together in a single firing cycle.

Granite comprises a mixture of felspar (consisting primarily of aluminosilicates of potassium and sodium), quartz (silica) and mica (consisting of hydrogen potassium aluminosilicate or hydrogen potassium magnesium aluminosilicate). A typical granite raw material composition for use in the present invention comprises 71–76 wt % $SiO_2$, 14–17 wt % $Al_2O_3$, 0.5–1.5 wt % $Fe_2O_3$, 0.07–0.09 wt % $TiO_2$, 0.8–1.7 wt % CaO, 0.05–0.15 wt % MgO, 3.2–4.8 wt % $K_2O$, 2.4–3.8 wt % $Na_2O$ and L.O.I. 1.0–1.75 wt %.

The sand for use as a raw material may typically comprise one or a mixture of more than one of the following compositions:

China clay extractions. These materials are inexpensive and their use in the invention is environmentally friendly because they are currently stockpiled and considered to be of little commercial value.

The selection of these preferred raw materials in conjunction with the tile composition in accordance with the invention provides lower silica levels in the composition as compared to typical known tile compositions which in turn leads to an increase in the thermal shock resistance of the tile body.

In the prior art, the use of higher silica amounts in turn requires the addition of cristobalite as part of the silica in order to achieve a thermal shock resistance. In accordance with the invention, the use of lower silica levels in the compositions provides a thermal gradient that does not require the addition of cristobalite in order to achieve thermal shock resistance. It has been found that the compositions of the present invention can also provide a reduction in the moisture expansion of the tile bodies, compared to typical known tile bodies with a consequent increase in the craze resistance of the tile bodies made in accordance with the present invention. Without being bound by theory, it is believed that the reduction in the moisture expansion results from the presence of granite material in the composition, which controls the formation of the glass phase and that reduction in the glass phase leads to reduction in the moisture expansion of the tile body. Thus the thermal

TABLE 1

| Material | $SiO_2$ wt % | $Al_2O_3$ wt % | $Fe_2O_3$ wt % | $TiO_2$ wt % | CaO wt % | MgO wt % | $K_2O$ wt % | $Na_2O$ wt % | LOI wt % |
|---|---|---|---|---|---|---|---|---|---|
| Sand 1 | 75.5–79.5 | 12.0–15.5 | 0.3–0.8 | 0.05–0.1 | 0.15–0.17 | 0.01–0.06 | 4.0–5.5 | 0.5–0.8 | 0.5–0.9 |
| Sand 2 | 81.0–83.6 | 9.8–11.3 | 0.5–0.6 | 0.01–0.05 | 0.14–0.25 | 0.04–0.07 | 3.0–4.5 | 0.3–0.4 | 0.5–0.9 |
| Sand 3 | 86.0–88.0 | 6.0–8.0 | 1.0–1.6 | 0.13–0.18 | 0.01–0.15 | 0.2–0.35 | 2.5–3.5 | 0.2–0.3 | 0.4–0.8 |

The clay for use in the tile composition may comprise one or more a mixture of more than one of the following compositions:

expansion of the body is enhanced by the granitic material reducing the quartz inversion at 573° C. between types a and

TABLE 2

| Material | $SiO_2$ wt % | $Al_2O_3$ wt % | $Fe_2O_3$ wt % | $TiO_2$ wt % | CaO wt % | MgO wt % | $K_2O$ wt % | $Na_2O$ wt % | LOI wt % |
|---|---|---|---|---|---|---|---|---|---|
| Clay 1 | 69.08 | 19.59 | 0.99 | 1.7 | 0.01 | 0.27 | 1.99 | 0.31 | 6.1 |
| Clay 2 | 64.91 | 22.85 | 1.12 | 1.34 | 0.08 | 0.23 | 1.53 | 0.26 | 6.4 |
| Clay 3 | 70.85 | 18.15 | 0.91 | 1.61 | 0.1 | 0.23 | 1.85 | 0.3 | 5.2 |
| Clay 4 | 49.7 | 32.54 | 2.42 | 0.95 | 0.05 | 0.17 | 1.39 | 0.14 | 12.1 |

Preferably, the mica has the composition, 72.0–74.5 wt % $SiO_2$, 14.0–16.5 wt % $Al_2O_3$, 1.0–2.0 wt % $Fe_2O_3$, 0.1–0.15 wt % $TiO_2$, 0.2–0.3 wt % CaO, 0.2–0.3 wt % MgO, 5.5–6.5 wt % $K_2O$, 0.25–0.75 wt % $Na_2O$ and 1.0–1.5 wt % L.O.I.

Preferably, the China clay has the following composition, 46.7–47.7 wt % $SiO_2$, 36.5–37.5 wt % $Al_2O_3$, 0.9–1.25 wt % $Fe_2O_3$, 0.02–0.05 wt % $TiO_2$, 0.02–0.1 wt % CaO, 0.2–0.4 wt % MgO, 1.7–2.5 wt % $K_2O$, 0.01–0.15 wt % $Na_2O$ and 11.5–12.5 wt % L.O.I.

Preferably, the limestone has the following composition, 0.37 wt $SiO_2$, 0.21 wt % $Al_2O_3$, 0.34 wt % $Fe_2O_3$, 0.02 wt % $TiO_2$, 49.88 wt % CaO, 4.14 wt % MgO, 0.1 wt % $K_2O$, 0.99 wt % $Na_2O$ and 44 wt % L.O.I.

The preferred sands and mica materials have compositions which typically constitute those of by-products of b and consequently the body does not need the addition of cristobalite to prevent cooling failures.

The composition in accordance with the invention has an increased amount of potassium and sodium oxides as compared to typical known compositions. This increases the fluxing action of the body, which in turn enables the composition to be subjectable to rapid firing cycles, enabling the composition to be used for single fired tiles. The increase in the amounts of alkali levels, resulting from $K_2O$ and $Na_2O$, also increases the modulus of rupture of the fired tiles. The felspathic nature of the granite also provides a good flux for the body, having high alkali ratio $K_2O$: $Na_2O$.

The alumina of the composition of the present invention is greater than that of typical known tile compositions. This is due to a higher proportion of the total silica percentage coming from aluminosilicates than quartz. This higher percentage of aluminosilicates results in the invention having better firing characteristics, in single layer roller kilns, than typical compositions.

In the composition of the present invention, the amount of MgO is greater than the typical known compositions and is present primarily as a result of being a subsidiary oxide in the limestone added to the composition. Such higher amounts of magnesium oxide are desirable for preventing glass phase formation on firing and thus help to reduce the moisture expansion and consequently to increase the resistance to crazing.

The present inventors have found that the formulations of the present invention can provide tiles with a fired shrinkage that is in the range that is generally considered by those in the art as "zero shrinkage" i.e. less than 0.8% comparing the lengths of the fired tile to that of the mould in the die box used in forming the tile. This enables a minimum size variability between tiles manufactured from the compositions of the present invention to be achieved.

The ceramic wall tile bodies formulated from granite and granite-derived material in accordance with the invention are suitable for firing in single layer roller kilns, either for single fire product, monoporosa product, or twice fired product. The compositions for tile bodies formulated in accordance with the present invention have been developed to utilise the benefits of single layer roller kilns, particularly for single fire products, and the latest fast fire glazes. The use of granite material can provide the required thermal expansion properties at a lower silica content than traditional tile bodies. The granite-derived body can have an improved craze resistance through the reduction of the moisture expansion of the tile body.

DESCRIPTION OF THE PREFERRED EMBODIMENTS

The present invention will now be described with reference to the following non-limiting Examples.

EXAMPLES 1 TO 5

Five different ceramic tile compositions were formulated from the starting materials and relative amounts thereof as specified in Table 3. The starting materials have the compositions as specified hereinabove. Each of the compositions was then subjected to a firing cycle under the following conditions: temperature of 1120° C. and firing time of 45 minutes.

Following firing of the tiles, various properties of the tiles of Examples 1 to 5 were measured, such as the shrinkage, water absorption, moisture expansion and thermal expansion. The results are shown in Table 4. The shrinkage was measured by the following procedure. The mould of the die box that forms the tile is measured, the tile is measured after firing and the shrinkage is expressed as a percentage difference compared to the original mould. It may be seen that the minimum shrinkage is for Examples 3 and 5 where substantially no shrinkage on firing was detected and the maximum shrinkage was for Example 4 having a shrinkage of 0.3.

The water absorption was measured in accordance with the procedures of BS6431 Part 11 (EN99). It may be seen that the water absorption ranged from 15.4 to 18.85%. It is known in the art that for the particular wall tiles known as B111 wall tiles, these should have an average water absorption of more than 10%.

The moisture expansion, which was measured in accordance with the procedures of BS6431 Part 21 (EN155), ranged from a minimum value of 0.016% to a maximum value of 0.034%. It is conventional in the art for the moisture expansion to be required to be less than 0.06%.

The thermal expansion was measured and is expressed as the cubical co-efficient of thermal expansion relative to the temperature range of 50–400° C. It may be seen that the thermal expansion ranged from 210.15 to $216.21 \times 10^{-7}$°C.$^{-1}$. Typically, the thermal expansion of wall tiles is required to be a maximum of $220.0 \times 10^{-7}$°C.$^{-1}$.

It may be seen that for Examples 1 to 5, the formulations meet all the requirements for ceramic wall tiles as laid down in BS6341.

EXAMPLES 6 AND 7

The compositions of Examples 1 and 2 were fired so as to form bisques having the following respective sizes 264×264×6 mm for Example 6 using the composition of Example 1 and 265×265×6 mm for Example 7 using the composition of Example 2. Bisques of Examples 6 and 7 when subjected to the above-specified water absorption and moisture expansion tests under BS6431 and the results are shown in Tables 5 and 6. It may be seen that for each of Examples 6 and 7, the water absorption and moisture expansion values are within the limits required by standards in the art.

The bisques of Examples 6 and 7 were also subjected to a test for measuring any thermal expansion from ambient temperatures to 100° C. as measured in accordance with the procedures of BS6431 Part 15 (EN103). The results are shown in Table 7. It is known in the art that the thermal expansion value should not exceed $9 \times 10^{-6}$°C.$^{-1}$ and so the thermal expansion values for both Example 6 and Example 7 are within the requirements in the art.

COMPARATIVE EXAMPLES 1 TO 3

Comparative Examples 1 to 3 used bisques which were already commercially available from manufacturers in the art. For Comparative Example 1, the bisque had dimensions of 154×154×5 mm. For Comparative Example 2 the bisque had dimensions of 153×153×5 mm. For Comparative Example 3 the bisque had dimensions of 249×199×6 mm. Those bisques were subjected to the same water absorption, moisture expansion and thermal expansion tests of Examples 6 and 7 and the results are shown respectively in Tables 5 to 7.

It may be seen from Table 5 that the water absorption tests that the bisques of Examples 6 and 7 have substantially the same water absorption properties as for known tiles. It may be seen from Table 6 that the bisques of Examples 6 and 7 have better moisture expansion properties than at least the tiles of Comparative Examples 1 and 2. It may be seen from Table 7 that the thermal expansion properties of the bisques of Examples 6 and 7 substantially correspond to those of the known tiles of Comparative Examples 1 to 3.

When comparing the results for the Examples and the Comparative Examples, the results for water absorption and thermal expansion reflect the design parameters that the bisque is to be used for. Accordingly, the achievement of an "improvement" in water absorption does not necessarily require a lower absorption when the product has to absorb water during the glazing process. The thermal expansion required for successful glazed tiles falls into a small range due to the need to keep the glaze under compression after firing to prevent crazing. The moisture expansion of the tile bodies formed in accordance with the invention is lower than for typical tile formulations and as such tiles made in accordance with the invention exhibit a better craze resistance than known tile bodies. The present invention provides the technical improvement of providing tile bodies that are not only commercially successful but also technically sound, and it is not necessary for the tile bodies fabricated in accordance with the invention to provide improved technical parameters as compared to known tile bodies.

TABLE 3

| Material (wt %) | Example 1 | Example 2 | Example 3 | Example 4 | Example 5 |
|---|---|---|---|---|---|
| Sand 1 | — | — | 18 | 9 | 14 |
| Sand 2 | 10 | 21 | 18 | 9 | 27 |
| Granite | 16 | 26 | 10 | 30 | 5 |
| China clay | — | 5 | 7 | 5 | — |
| Sand 3 | 12 | — | — | — | — |
| Clay 1 | 30 | 31 | 14 | 15 | — |
| Clay 2 | 20 | 5 | — | — | — |
| Clay 3 | — | — | 14 | 15 | 27 |
| Clay 4 | — | — | 7 | 5 | 15 |
| Limestone | 12 | 12 | 12 | 12 | 12 |

TABLE 4

| Fired Properties | Example 1 | Example 2 | Example 3 | Example 4 | Example 5 |
|---|---|---|---|---|---|
| Shrinkage | 0.3 | 0.2 | 0 | 0.25 | 0.0 |
| Water Absorption % | 17.2 | 15.4 | 18.85 | 17.73 | 15.8 |
| Moisture Expansion % | 0.034 | 0.027 | 0.033 | 0.016 | 0.018 |
| Thermal Expansion $3a \times 10^{-7 \circ} C.^{-1}$ | 214.8 | 211.27 | 216.21 | 210.15 | 212.37 |

TABLE 5

| Example | | Water Absorption (%) |
|---|---|---|
| Example 6 | Sample 1 | 15.8 |
| | Sample 2 | 15.9 |
| | | Average 15.9% |
| Example 7 | Sample 1 | 16.2 |
| | Sample 2 | 17.0 |
| | | Average = 16.6% |
| Comparative Example 1 | Sample 1 | 16.7 |
| | Sample 2 | 17.1 |
| | | Average = 16.9% |
| Comparative Example 2 | Sample 1 | 15.3 |
| | Sample 2 | 15.4 |
| | | Average = 15.4% |
| Comparative Example 3 | Sample 1 | 15.3 |

TABLE 6

| Example | Moisture Expansion (%) |
|---|---|
| Example 6 | 0.034 |
| Example 7 | 0.027 |
| Comparative Example 1 | 0.038 |
| Comparative Example 2 | 0 045 |
| Comparative Example 3 | 0.011 |

TABLE 7

| Example | Thermal Expansion ($\times 10^{-6 \circ}$ C.$^{-1}$) | | | |
|---|---|---|---|---|
| Example 6 | Direction 1 | 4.50 | Direction 2 | 4.00 |
| Example 7 | Direction 1 | 5.25 | Direction 2 | 5.25 |
| Comparative Example 1 | Direction 1 | 5.25 | Direction 2 | 4.00 |

TABLE 7-continued

| Example | Thermal Expansion ($\times 10^{-6 \circ}$ C.$^{-1}$) | | | |
|---|---|---|---|---|
| Comparative Example 2 | Direction 1 | 4.38 | Direction 2 | 4.88 |
| Comparative Example 3 | Direction 1 | 4.25 | Direction 2 | 4.13 |

What is claimed is:

1. A composition for ceramic tiles, the composition being formulated from materials including granite and comprising the following components, given in weight percent, based on the total weight of the composition:

| | |
|---|---|
| $SiO_2$ | 55.8–63.5 wt % |
| $Al_2O_3$ | 15–17 wt % |
| $K_2O$ | 2–3 wt % |
| $Na_2O$ | 0.5–1.5 wt % |
| CaO | 6.13–6.31 wt % |
| MgO | 0.5–0.6 wt % |
| L.O.I. | 6–7 wt %. |

2. A composition according to claim 1 having the following components:

| | |
|---|---|
| $SiO_2$ | 56–64 wt % |
| $Al_2O_3$ | 15–17 wt % |
| $K_2O$ | 2–3 wt % |
| $Na_2O$ | 0.5–1.5 wt % |
| CaO | 5–5.7 wt % |
| MgO | 0.5–0.6 wt % |
| L.O.I. | 6–7 wt %. |

3. A composition for a tile body comprising 5–50 wt % sand, 20–60 wt % clay, 5–15 wt % limestone and 5–40 wt % granite.

4. A composition according to claim 3 comprising 15–45 wt % sand, 30–50 wt % clay, 10–13 wt % limestone and 5–30 wt % granite.

5. A composition according to claim 3 wherein the granite comprises 71–76 wt % $SiO_2$, 14–17 wt % $Al_2O_3$, 0.5–1.5 wt % $Fe_2O_3$, 0.07–0.09 wt % $TiO_2$, 0.8–1.7 wt % CaO, 0.05–0.15 wt % MgO, 3.2–4.8 wt % $K_2O$, 2.4–3.8 wt % $Na_2O$ and L.O.I. 1.0–1.75 wt %.

6. A composition according to claim 4 wherein the granite comprises 71–76 wt % $SiO_2$, 14–17 wt % $Al_2O_3$, 0.5–1.5 wt % $Fe_2O_3$, 0.07–0.09 wt % $TiO_2$, 0.8–1.7 wt % CaO, 0.05–0.15 wt % MgO, 3.2–4.8 wt % $K_2O$, 2.4–3.8 wt % $Na_2O$ and L.O.I. 1.0–1.75 wt %.

7. A composition according to claim 3 further including 5–25 wt % mica.

8. A composition according to claim 4 further including 5–25 wt % mica.

9. A composition according to claim 5 further including 5–25 wt % mica.

10. A composition according to claim 6 further including 5–25 wt % mica.

11. A composition according to claim 3 wherein at least some of the sand and the mica are a by-product of China clay extraction.

12. A composition according to claim 4 wherein at least some of the sand and the mica are a by-product of China clay extraction.

13. A composition according to claim 7 wherein at least some of the sand and the mica are a by-product of China clay extraction.

14. A composition according to claim 8 wherein at least some of the sand and the mica are a by-product of China clay extraction.

15. A composition according to claim 3 further including 5–15 wt % China clay.

16. A composition according to claim 4 further including 5–15 wt % China clay.

17. A composition according to claim 5 further including 5–15 wt % China clay.

18. A composition according to claim 6 further including 5–15 wt % China clay.

19. A method of manufacturing a tile body, the method comprising formulating a composition according to claim 1 and firing the composition to form a tile body.

20. A method according to claim 19 wherein a glaze is applied to a bisque of the formulated composition prior to firing and the firing step comprises a single firing step wherein the bisque and the glaze are fired together in a single firing cycle.

* * * * *